United States Patent [19]

Anan et al.

[11] Patent Number: 4,933,406
[45] Date of Patent: Jun. 12, 1990

[54] CONTACT LENS ARTICLE MADE OF SILICON- AND FLUORINE-CONTAINING RESIN

[75] Inventors: Keizo Anan; Naoyuki Amaya; Yoshishige Murata, all of Tsukuba; Takayuki Otsu, Nara; Hiroshi Kawashima, Ina; Satoshi Kubota, Minowamachi; Masaru Egawa, Ina, all of Japan

[73] Assignees: Nippon Oil and Fats Co., Ltd.; Seiko Epson Corp., Tokyo, Japan

[21] Appl. No.: 403,484

[22] Filed: Sep. 6, 1989

[30] Foreign Application Priority Data

Sep. 12, 1988 [JP] Japan ................... 63-227801
Nov. 15, 1988 [JP] Japan ................... 63-286655
Jun. 26, 1989 [JP] Japan ................... 1-163438

[51] Int. Cl.$^5$ ............... C08F 18/20; C08F 222/10; C08F 222/18
[52] U.S. Cl. .................. 526/245; 526/279; 523/107
[58] Field of Search .......... 526/245, 279; 523/107

[56] References Cited

U.S. PATENT DOCUMENTS

| | | | |
|---|---|---|---|
| 4,433,125 | 2/1984 | Ichinohe et al. | 528/32 |
| 4,525,563 | 6/1985 | Shibata et al. | 526/245 |
| 4,540,761 | 9/1985 | Kawamura et al. | 523/107 |
| 4,602,074 | 7/1986 | Mizutani et al. | 526/245 |
| 4,780,515 | 10/1988 | Deichert | 526/245 |

FOREIGN PATENT DOCUMENTS 0219884 4/1987 European Pat. Off. .
61-209286 9/1986 Japan ................... 526/245

Primary Examiner—Joseph L. Schofer
Assistant Examiner—N. Sarofim
Attorney, Agent, or Firm—Keil & Weinkauf

[57] ABSTRACT

A contact lens article comprises a resin obtained by copolymerizing starting monomer components containing a silicon-containing compound (A) represented by the formula

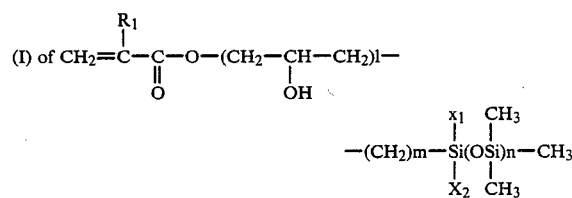

wherein $R_1$ represents a hydrogen atom or a methyl group, $X_1$ and $X_2$ each represent a methyl group or

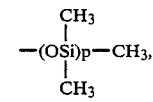

$l$ represents 0 or 1, m represents an integer of 1 to 3 and n and p each represent an integer of 0 to 3; a fluorine-containing compound (B) represented by the formula (II) of:

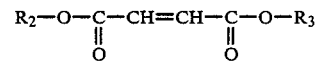

wherein at least one of $R_2$ and $R_3$ represents a straight chain or branched chain fluoroalkyl group represented by $-C_hH_kF_{2h+l-k}$ in which h represents an integer of 2 to 18, k represents an integer of 1 to 2 multiplied by h and when one of $R_2$ and $R_3$ is $-C_hH_kF_{2h+l-k}$, the other of $R_2$ and $R_3$ represents an alkyl group having 1 to 12 carbon atoms, an alkenyl group having 2 to 12 carbon atoms or a cycloalkyl group having 3 to 12 carbon atoms; and a radical polymerizable vinyl monomer.

12 Claims, No Drawings

CONTACT LENS ARTICLE MADE OF SILICON- AND FLUORINE-CONTAINING RESIN

BACKGROUND OF THE INVENTION

This invention relates to a contact lens article made of a silicon- and fluorine-containing resin. More particularly, it relates to a contact lens article having superior oxygen permeability and shape stability.

Among the contact lenses now in extensive use, there are known an oxygen-permeable hard contact lens and a water-containing soft contact lens. The water-containing soft contact lens is excellent in wearing feeling, but insufficient in oxygen permeability of the lens material. While it may be contemplated to elevate water content in the lens material to improve its oxygen permeability, reports of clinical data demonstrate that the lens is apt to be contaminated by miscellaneous bacteria and serious complications may be brought about to cornea and conjunctiva. Conversely, the oxygen-permeable hard contact lens is enjoying high evaluation with respect to high oxygen permeability, astigmatism-curative effects, durability and safety, and is becoming a prevalent contact lens. In keeping therewith, researches are being made extensively in the field of oxygen-permeable hard contact lens. However, in these researches of the oxygen-permeable contact lens, the main concern is its oxygen-permeability, while the other properties required of the contact lens have not been taken account of sufficiently.

For example, the contact lenses described in Japanese Patent Publication No. 8769/1987 and Japanese Patent Publications Nos. 61928/1987 and 36646/1988 are excellent in oxygen permeability, but are unsatisfactory in shape stability and resistance to contamination. Dialkyl fumarate, employed in Japanese Laid-open Patent Applications Nos. 99720/1987 and 212618/1987, has only low copolymerizability and, even supposing that it is copolymerized in some way or other, it is so brittle that it can be cracked or broken very easily, causing dangers to the user. On the other hand, the contact lens shown in Japanese Laid-open Patent Application No. 176909/1986 is low in oxygen permeability so as to be unsuitable for continuous wearing to which particular attention has been directed in recent years.

OBJECTS AND SUMMARY OF THE INVENTION

It is an object of the present invention to provide a contact lens article having properties such as oxygen permeability, shape stability, resistance to contamination and durability in a well-balanced fashion.

The above and other objects of the present invention will become more apparent from the following description.

According to the present invention, there is provided a contact lens article comprising a resin obtained by copolymerizing starting monomer components containing a silicon-containing compound (A) represented by the formula (I)

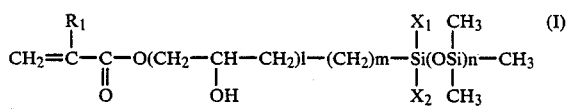

wherein $R_1$ represents a hydrogen atom or a methyl group, $X_1$ and $X_2$ each represent a methyl group or

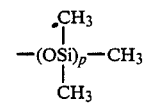

l represents 0 or 1, m represents an integer of 1 to 3 and n and p each represent an integer of 0 to 3;

a fluorine-containing compound (B) represented by the formula (II)

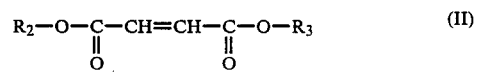

wherein at least one of $R_2$ and $R_3$ represents a straight chain or branched chain fluoroalkyl group represented by $-C_hH_kF_{2h+1-k}$ in which h represents an integer of 2 to 18, k represents an integer of 1 to 2 multiplied by h and when one of $R_2$ and $R_3$ is $-C_hH_kF_{2h+1-k}$, the other of $R_2$ and $R_3$ represents an alkyl group having 1 to 12 carbon atoms, an alkenyl group having 2 to 12 carbon atoms or a cycloalkyl group having 3 to 12 carbon atoms; and a radical polymerizable vinyl monomer.

PREFERRED EMBODIMENTS OF THE INVENTION

The present invention will be explained in more detail hereinbelow.

The contact lens of the present invention is a copolymer obtained by copolymerizing monomer components containing a particular silicon-containing compound (A), a particular fluorine-containing compound (B) and a radical polymerizable vinyl monomer, and, further, optionally a monomer component containing a particular vinyl compound (C).

The aforementioned silicon-containing compound (A) employed in the present invention may be expressed by the following formula (I)

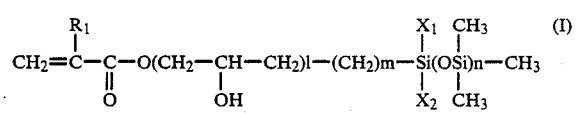

wherein $R_1$ represents a hydrogen atom or a methyl group and $X_1$ and $X_2$ each represent a methyl group or

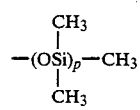

while l indicates 0 or 1, m indicates an integer of 1 to 3 and n and p each indicate an integer of 0 to 3. In the above formula, l stands for the skeleton length for affording certain hydrophilic properties to the polymer and should be 0 or 1 for preserving the copolymer strength. m is one of the factors determining the length of a portion interconnecting the siloxanyl group and the (meth)acryl group and should be an integer of 1 to 3 for maintaining monomer stability and copolymer strength. That is, with m=0, the monomer or the copolymer tends to undergo hydrolysis. With m in excess of 3, the copolymer is lowered in strength. The values of n and p are factors determining the size of the siloxanyl group. With the values of n and p in excess of 4, the polymerization degree cannot increase and the workability of the polymer is lowered. Therefore, n and p should be integers of 0 to 3. The silicon-containing compounds (A) represented by, the formula (I) may be enumerated by, for example, trimethylsilylmethyl (meth)acrylate, pentamethyl disiloxanyl methyl (meth)acrylate, methylbis(-trimethylsiloxy) silylmethyl(meth)acrylate, tris(trimethylsiloxy) silylmethyl (meth)acrylate, bis(trimethylsiloxy) (pentamethyldisiloxanyloxy) silylmethyl (meth)acrylate, trimethylsiloxy bis(pentamethyldisiloxanyloxy) silylmethyl (meth)acrylate, tris(pentamethyldisiloxanyloxy) silylmethyl (meth)acrylate, trimethylsilylethyl (meth)acrylate, pentamethyldisiloxanylethyl (meth)acrylate, methylbis(trimethylsiloxy)silylethyl (meth)acrylate, tris(trimethylsiloxy)silylethyl (meth)acrylate, bis(trimethylsiloxy) (pentamethyldisiloxanyloxy)silylethyl (meth)acrylate, trimethylsiloxybis(pentamethyldisiloxanyloxy) silylethyl (meth)acrylate, tris(pentamethyldisiloxanyloxy) silylethyl (meth)acrylate, trimethylsilylpropyl (meth)acrylate, pentamethyldisiloxanylpropyl (meth)acrylate, methylbis(trimethylsiloxy)silylpropyl (meth)acrylate, tris(trimethylsiloxy)-silylpropyl (meth)acrylate, bis(trimethylsiloxy)(pentamethyldisiloxanyloxy)silylpropyl (meth)acrylate, trimethylsiloxybis(pentamethyldisiloxanyloxy)silylpropyl (meth)acrylate, tris(pentamethyldisiloxanyloxy)-silylpropyl (meth)acrylate, 2-hydroxy-3-trimethylsilylethoxypropyl (meth)acrylate, 2-hydroxy-3-pentamethyldisiloxanylethoxypropyl (meth)acrylate, 2-hydroxy-3-methylbis(trimethylsiloxy)silylethoxypropyl (meth)acrylate, 2-hydroxy-3-bis(trimethylsiloxy)(pentamethylsiloxanyloxy)silylethoxypropyl (meth)acrylate, 2-hydroxy-3-tris(trimethylsiloxy)silylethoxypropyl (meth)acrylate, 2-hydroxy-3-trimethylsiloxybis(pentamethyldisiloxanyloxy)silylethoxypropyl (meth)acrylate, 2-hydroxy-3-tris(pentamethyldisiloxanyloxy)silylethoxypropyl (meth)acrylate, 2-hydroxy-3-trimethylsilylpropyloxypropyl (meth)acrylate, 2-hydroxy-3-pentamethyldisiloxanylpropyloxypropyl (meth)acrylate, 2-hydroxy-3-methylbis(trimethylsiloxy)silylpropyloxypropyl (meth)acrylate, 2-hydroxy-3-(bis)(trimethylsiloxy)(pentamethyldisiloxanyloxy) silylpropyloxypropyl (meth)acrylate, 2-hydroxy-3-tris(trimethylsiloxy)silylpropyloxypropyl (meth)acrylate, 2-hydroxy-3-trimethylsiloxybis(pentamethyl disiloxanyloxy)silylpropyloxypropyl (meth)acrylate, 2-hydroxy-3-tris(pentamethyldisiloxanyloxy)silylpropyloxypropyl (meth)acrylate and dimethyl(triphenylsiloxy)silylpropyl (meth)acrylate.

The above fluorine-containing compound (B) employed in the present invention may be represented by the following formula (II)

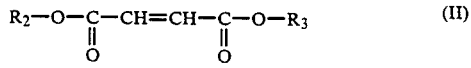
$$R_2-O-\underset{\underset{O}{\|}}{C}-CH=CH-\underset{\underset{O}{\|}}{C}-O-R_3 \quad (II)$$

wherein $R_2$ and $R_3$ denote the same or different groups and at least one of $R_2$ and $R_3$ denotes a straight chain or branched chain fluoroalkyl group represented by the formula $-C_hH_kF_{2h+1-k}$, h denotes an integer of 2 to 18 and k denotes an integer of 1 to 2 X h. When only one of $R_2$ and $R_3$ denotes $-C_hH_kF_{2h+1-k}$, the other of $R_2$ and $R_3$ denotes an alkyl group having 1 to 12 carbon atoms, an alkenyl group having 2 to 12 carbon atoms or a cycloalkyl group having 3 to 12 carbon atoms. The larger the value of h, and the larger the branched chains, the higher is the oxygen permeability. However, the larger the value of h, the lower is the shape stability and, with h not less than 19, manufacture becomes difficult, so that such high value of h cannot be adopted. On the other hand, the larger the value of k, that is, the lesser the number of fluorine (F) atoms, the lower is the oxygen permeability. With k=0, chemical stability of the monomer is lowered. Therefore, k is selected to be 1 to 2 X h. On the other hand, when only one of $R_2$ and $R_3$ is $-C_hH_kF_{2h+1-k}$, and the number of carbon atoms of the other of $R_2$ and $R_3$, that is, the alkyl group, the alkenyl group or the cycloalkyl group, is not less than 13, manufacture becomes difficult, so that such larger value of the number of carbon atoms likewise cannot be adopted. The fluorine-containing compounds (B) represented by the formula (II) may be enumerated by, for example, methyl-2,2,2-trifluoroethylfumarate, methyl-2,2,2-trifluoro-1-trifluoromethylethyl fumarate, methyl-3,3,4,4,5,5,6,6,6-nonafluorohexyl fumarate, allyl(2,2,2-trifluoroethyl) fumarate, allyl(2,2,2-trifluoro-1-trifluoromethyl) ethyl fumarate, allyl-3,3,4,4,5,5,6,6,6-nonafluorohexyl fumarate, isopropyl-2,2,2-trifluoroethyl fumarate, isopropyl(2,2,2-trifluoro-1-trifluoromethyl) ethyl fumarate, isopropyl-3,3,4,4,4-pentafluorobutyl fumarate, isopropyl-3,3,4,4,5,5,6,6,6-nonafluorohexyl fumarate, isopropyl-3,3,4,4,5,5,6,6,7,7,8,8,8-tridecafluorooctyl fumarate, isopropyl-3,3,4,4,5,5,6,6,7,7,8,8,9,9, 10,10,10-heptadecafluorodecyl fumarate, isopropyl-2,2,3,3-tetrafluoropropyl fumarate, isopropyl-2,2,3,3,4,4,5,5-octafluoropentyl fumarate, tert-butyl-2,2,2-trifluoroethyl fumarate, tert-butyl-2,2,2-trifluoro-1-trifluoromethylethyl fumarate, tert-butyl-3,3,4,4,4-pentafluorobutyl fumarate, tert-butyl-3,3,4,4,5,5,6,6,6-nonafluorohexyl fumarate, tert-butyl-3,3,4,4,5,5,6,6,7,7,8,8,8-tridecafluorooctyl fumarate, tert-butyl-3,3,4,4,5,5,6,6,7,7,8,8,9,9, 10,10,10-heptadecafluorodecyl fumarate, tert-butyl-2,2,3,3-tetrafluoropropyl fumarate, tert-butyl-2,2,3,3,4,4,5,5-octafluoropentyl fumarate, 2-ethylhexyl-2',2',2'-trifluoroethyl fumarate, 2-ethylhexyl-2',2',2'-trifluoro-1'-trifluoromethylethyl fumarate, 2-ethylhexyl-3',3',4',4',4'-pentafluorobutyl fumarate, 2-ethylhexyl-3',3',4',4',5',5',6,6,6-nonafluorohexyl fumarate, 2-ethylhexyl-3',3',4',4',5',5',6',6', 7',7',8',8',8'-tridecafluorooctyl fumarate, 2-ethylhexyl-3',3',4,4',5',5',6',6',7',7', 8',8',9',9 10',10',10'-heptadecafluorodecyl fumarate, 2-ethylhexyl-2', 2',3',3'-tetrafluoropropyl fumarate, 2-ethylhexyl-2',2',3',3',4',4',5',5'-octafluoropentyl fumarate, cyclohexyl-2,2,2-trifluoroethyl fumarate, cyclohexyl-2,2,2-trifluoro-1-trifluoromethylethyl fumarate, cyclohexyl-3,3,4,4,4-pentafluorobutyl fumarate, cyclohexyl-3,3,4,4,5,5,6,6,6-nonafluorohexyl fumarate, cyclohexyl-3,3,4,4,5,5,6,6,7,7,8,8,8-tridecafluorooctyl fumarate, cyclohexyl-3,3,4,4,5,5,6,6,7,7,8,8,9,9, 10,10,10-heptadecafluorodecyl fumarate, cyclohexyl-2,2,3,3-tetrafluoropropyl fumarate, cyclohexyl-2,2,3,3,4,4,5,5-octafluoropentyl fumarate, bis(2,2,2-trifluoroethyl) fumarate, (2,2,2-trifluoro-1-trifluoroethyl) fumarate, bis(3,3,4,4,4-pentafluorobutyl) fumarate, bis(3,3,4,4,5,5,6,6,6-nonafluorohexyl) fumarate, bis(3,3,4,4,5,5,6,6,7,7,8,8,8-tridecafluorooctyl) fumarate, bis(3,3,4,4,5,5,6,6,7,7,8,8,9,9,10,10,10-heptadecafluorodecyl) fumarate and bis(2,2,3,3-tetrafluoropropyl) fumarate and bis(2,2,3,3,4,4,5,5-octafluoropentyl) fumarate, and corresponding maleates. These may be used alone or as a mixture. In this case, the fluorine-containing compounds may be in the cis or trans form. However, the fumarates in the trans form is more preferred in view of polymerizability and copolymerizability.

The aforementioned radical polymerizable vinyl monomers employed in the present invention may be selected depending upon the properties of the produced polymers. For example, polyfunctional vinyl monomers are desirable as the radical polymerizable vinyl monomers capable of improving shape stability and thermal resistance of and affording grindability to the produced copolymers. Examples of these polyfunctional vinyl monomers include ethyleneglycol di(meth)acrylate, diethyleneglycol di(meth)acrylate, triethyleneglycol di(meth)acrylate, tetraethyleneglycol di(meth)acrylate, dipropyleneglycol di(meth)acrylate, trimethylolpropane tri(meth)acrylate, diallyl phthalate, diallyl isophthalate, diallyl terephthalate, vinyl (meth)acrylate, allyl (meth)acrylate, diethylene glycolbisallyl carbonate, 2-allyloxyethyl (meth)acrylate, triallyl trimellitate, triallyl cyanurate, triallyl isocyanurate, divinylbenzene and divinyl adipate.

The radical polymerizable vinyl monomers for improving the wettability by water of the produced copolymers may be enumerated by, for example, (meth)acrylic acid, 2-hydroxyethyl (meth)acrylate, (meth)acrylic amide, N, N-dimethylacryl amide, N-vinyl-2-pyrrolidone and acryloyl morpholine. Besides these vinyl monomers, for example, styrene, p-methylstyrene, o-chlorostyrene, p-chlorostyrene, vinyl acetate, vinyl propionate, vinyl pivalate, ethyl vinyl ether, n-butyl vinyl ether or vinyl pyridine, may also be employed.

According to the present invention, the mixing ratios of the above mentioned essential monomer components may be determined in consideration of the physical properties of the produced copolymers. It is, however, preferred that the above mentioned silicon-containing compound (A) be contained in an amount of 10 to 90 wt.% and the fluorine-containing compound (B) be contained in an amount of 90 to 10 wt.% and, based on 100 parts by weight of the comonomer containing these components, 0.1 to 50 parts by weight and particularly 1 to 30 parts by weight of the radical polymerizable vinyl monomer may be preferably contained. With the content of the silicon-containing compound (A) less than 10 wt.% and with the content of the fluorine-containing compound (B) less than 10 wt.%, oxygen permeability is undesirably lowered. With the content of the fluorine-containing compound in excess of 90 wt.%, the strength of the copolymer as the contact lens material is undesirably lowered. Furthermore, with the content of the fluorine-containing compound (B) in excess of 90 wt.%, water-repellency of the copolymer is undesirably increased.

In the contact lens of the present invention, one or more of the vinyl compounds (C) represented by the following formula (III) may be used as the monomer components besides the above mentioned essential monomer components:

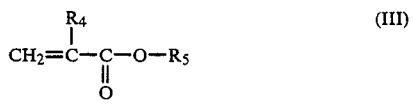
(III)

wherein $R_4$ represents a hydrogen atom or a methyl group and $R_5$ represents an alkyl group having 1 to 12 carbon atoms, an alkenyl group having 2 to 12 carbon atoms, a cycloalkyl group having 3 to 12 carbon atoms, a group containing an aromatic ring, or a straight chain or branched chain fluoroalkyl group having the formula $-CH_kF_{2h+1-k}$, h being an integer of 2 to 18 and k an integer of 1 to 2 × h. When $R_5$ in the above formula denotes an alkyl group, an alkenyl group, a cycloalkyl group or a group containing an aromatic ring, and the number of carbon atoms exceeds 12, manufacture becomes difficult. The values of h and k of the fluoroalkyl group outside the above mentioned range cannot be adopted by the same reason as described in connection with the above formula (II). When the vinyl compound (C) represented by the formula (III) contains as $R_5$ an alkyl group, an alkenyl group, a cycloalkyl group or a group containing an aromatic ring, the machinability and the grindability required of the contact lens may be improved further, while shape stability and thermal resistance can also be improved. The vinyl compound (C) may preferably be enumerated by, for example, methyl (meth)acrylate, ethyl (meth)acrylate, isopropyl (meth)acrylate, tert-butyl (meth)acrylate, cyclohexyl (meth)acrylate and benzyl (meth)acrylate. These vinyl compounds may be used alone or as a mixture. If the aforementioned straight chain or branched chain fluoroalkyl group containing compound is used as $R_5$, it becomes possible to increase the mechanical strength while minimizing the lowering of oxygen permeability of the contact lens. The vinyl compounds (C) in this case may preferably be enumerated by, for example, 2,2,2-trifluoroethyl (meth)acrylate, 2,2,2-trifluoro-1-trifluoromethylethyl (meth)acrylate, 3,3,4,4,5,5,5-heptafluoropentyl (meth)acrylate, 3,3,4,4,5,5,6,6,6-nonafluorohexyl (meth)acrylate, 3,3,4,4,5,5,6,6,7,7,8,8,8-tridecafluorooctyl (meth)acrylate, 3,3,4,4,5,5,6,6,7,7,8,8,9,9,10,10,10-heptadecafluorodecyl (meth)acrylate, 1,1,2,2-tetrahydroperfluorooctadecyl (meth)acrylate, 2,2,3,3-tetrafluoropropyl (meth)acrylate, 2,2,3,3,4,4,5,5,6,6,7,7,8,8,9,9-hexadecafluorononyl (meth)acrylate, and 2,2,3,3,4,4,5,5,6,6,7,7,8,8,9,9,10,10, 11,11-eicosafluoroundecyl (meth)acrylate.

When the vinyl compound (C) represented by the formula (III) is employed in the present invention, the mixing ratio of each monomer component is preferably such that the silicon-containing compound (A) accounts for 10 to 70 wt.%, the fluorine-containing compound (B) accounts for 5 to 60 wt.% and the vinyl compound (C) accounts for 5 to 70 wt.%, based on the weight of the total monomers. With the content less than 10 wt.% of the above mentioned silicon-containing compound (A), oxygen permeability of the copolymer is undesirably lowered. On the other hand, with the content in excess of 70 wt.% of the compound (A), the strength of the copolymer as the lens material is undesirably lowered. If the content of the fluorine-containing compound (B) is less than 5 wt.%, the oxygen permeability of the copolymer is undesirably lowered. On the other hand, if the content of the compound (B) is in excess of 60 wt.%, water-repellency of the copolymer is undesirably increased. If the content of the vinyl compound (C) is less than 5 wt.%, the strength of the copolymer is lowered. If the vinyl compound (C) is free of fluorine atoms, and is used in an amount in excess of 70 wt.%, the oxygen permeability of the composition is undesirably lowered drastically. On the other hand, if the vinyl compound (C) contains fluorine atoms and is used in an amount in excess of 70 wt.%, water-repellency of the composition is excessively increased undesirably. As mentioned hereinabove, the mixing ratio of the radical polymerizable vinyl monomer is preferably 0.1 to 50 parts by weight and more preferably 1 to 30 parts by weight to 100 parts by weight of the starting monomer components containing the above mentioned components.

In preparing a contact lens in accordance with the present invention, the aforementioned monomer components may be copolymerized by any methods known per se, such as a method of directly copolymerizing the monomer components containing a polymerization initiator, or a method of copolymerizing the monomer components admixed further with a photosensitizer in the presence of irradiated ultraviolet rays. More specifically, the above mentioned monomers may be polymerized or copolymerized in suitable vessels, such as test tubes, to produce round bars or blocks, which are subsequently machined, ground or otherwise worked mechanically to a contact lens in accordance with desired design data. Alternatively, the monomers containing a polymerization initiator may be introduced into a space defined between two juxtaposed molds to form directly a contact lens by mold polimerization. Still alternatively, a suitable amount of monomer components containing a polymerization initiator may be supplied dropwise into a rotating vessel and polymerized or copolymerized in situ to form a lens, or a polymer produced in advance by a radical polymerization method may be melted in a suitable solvent and the solvent removed by casting to produce a contact lens. The polymerization initiator employed in polymerizing the monomers in the above methods may be selected from the group consisting of, for example, azo compounds and organic peroxides having a decomposition temperature of not higher than 120° C. at selected half-life value for 10 hours. The organic peroxides or the azo compounds may preferably include benzoyl peroxide, diisopropyl peroxydicarbonate, t-butylperoxy-2-ethyl hexanoate, t-butylperoxypivalate, t-butylperoxy diisobutyrate, lauroyl peroxide, azobis isobutyronitrile and azobis(2,4-dimethyl valeronitrile). The polymerization initiator may be preferably employed in an amount of not more than 10 parts by weight and particularly in an amount of not more than 5 parts by weight to 100 parts by weight of the starting monomer material.

For copolymerizing the monomers in the above methods for producing the contact lens, the polymerization system may be preferably polymerized under deaerating conditions or under an atmosphere of an inert gas, such as nitrogen, carbon dioxide or helium. The copolymerization temperature is preferably in the range of 30 to 120° C., depending on the kind of the polymerization initiator employed. The duration of polymerization is preferably 10 to 96 hours.

The starting monomer material may be admixed with colorants, such as pigments, or with additives, such as ultraviolet ray absorber.

According to the present invention, the contact lens produced by the above described methods may be subjected to treatment with an acid or an alkali or to low temperature plasma processing for surface modification. The hydrophilic monomers may be, for example, graft polymerized by low temperature plasma processing for improving the wearing feeling.

The contact lens of the present invention is prepared by copolymerizing the fluorine-containing material (B) containing saturated fluoroalkyl groups, the silicon-containing compound (A) containing siloxanyl groups and the radical polymerizable vinyl monomer, as the essential components, so that it is endowed with properties required of the contact lens, such as oxygen permeability, shape stability, resistance to contamination or durability, in a well-balanced fashion. If the vinyl compound (C) is added further to the components, it becomes possible to improve further the machinability and grindability of the contact lens and to elevate thermal resistance and mechanical strength while minimizing the lowering of oxygen permeability. Therefore, the contact lens of the present invention is free from problems inherent to contact lenses of high oxygen permeability, such as shape stability or wettability with water, so that there is a prospect of utilizing the teaching of the present invention to contact lenses of higher performance.

EXAMPLES OF THE INVENTION

The present invention will be explained in more detail with reference to Examples which are given by way of illustraion only and are not intended for limiting the scope of the invention.

In these Examples, the parts indicate those by weight.

EXAMPLE 1

45 parts of tris(trimethylsiloxy)silylpropyl methacrylate, 40 parts of isopropyl-2,2,2-trifluoro-1-trifluoromethylethyl fumarate, 8 parts of diethyleneglycol dimethacrylate, 7 parts of methacrylic acid and 1 part of azobis(2,4-dimethylvaleronitrile) were mixed thoroughly. The resulting mixture was introduced into a glass tube, which was then melted and sealed in vacuum after the inside of the tube was subjected to replacement with nitrogen and deaeration in a repeated manner. This sealed glass vessel was then heated in lukewarm water at 40° C. for ten hours, at 45° C. for five hours, at 55° C. for three hours and at 70° C. for three hours and then heated in an atmospheric oven at 90° C. for two hours and at 100° C. for ten hours to effect polymerization to produce a round bar. This round bar was cut, machined and ground to produce a contact lens. The charged amount of each monomer is shown in Table 1. The various properties of the produced contact lens were measured by the following methods. The results are shown in Table 2.

Coefficient of Oxygen Permeability

Using a MULTIRANGE DO & TEMPERATURE ANALYZER, produced by XERTEX CORPORATION under the trade name of MODEL 2110, the coefficient of oxygen permeability was measured of a test piece 12.7 mm in diameter and 0.2 mm in thickness in a physiological saline of 0.9 wt.% at 35° C. to find the DK value (cc.cm/cm$^2$ sec mmHg).

Resistance against Contamination

A test piece 12.7 mm in diameter and 0.2 mm in thickness was immersed in a solution of physiological saline of 0.5 wt.% of egg white lysozyme. The absorption of the light at 280 nm before and after the immersion was measured to find the amount of the egg white lysozyme affixed to the test piece.

Vickers Hardness

The Vickers hardness was measured using a TERASAWA's MM-2 type micro hardness tester produced by TAIYO TESTER CO., LTD.

Contact Angle

The contact angle was measured by a captive bubble method using a contact angle meter CA-D type produced by KYOWA SCIENTIFIC CO., LTD.

Mechanical Strength

The mechanical strength was measured pursuant to the bending strength testing method for hard plastics in JIS K7203, using a flat plate sample 2mm in thickness, 50 mm in length and 10 mm in width, which had been prepared separately by polymerization.

Stability in Shape

Contact lens samples each 7.8 mm in base curve, 9.0 mm in diameter, 0.15 mm in central thickness and a power in terms of diopter (D) of −3.0, were produced, and measurements were made of changes in shape and power before and after immersion of the test samples for four weeks in physiological saline of 50° C. The samples were adjudged to be acceptable when they met the requirements of the changes in the base curve being not more than ±0.02 mm, changes in diameter being not more than ±0.2 mm changes in the central thickness being not more than ±0.001 mm and the changes in the power being not more than ±0.10 D.

EXAMPLE 2

45 parts of methylbis(trimethylsiloxy)silylpropyl methacrylate, 35 parts of isopropyl-3,3,4,4,5,5,6,6,7,7,8,8,9,9,10,10,10-heptadecafluorodecyl fumarate, 10 parts of vinyl methacrylate and 10 parts of methacrylic acid were mixed thoroughly with 1 part of benzoyl peroxide and the resulting mixture was introduced into a glass tube, which was then melted and sealed in vacuum after the inside of the tube was subjected to replacement with nitrogen and deaeration in a repeated manner. This sealed tube was heated at 70° C. for 24 hours and then heated at 100° C. for two hours to effect the polymerization to produce a round bar. The round bar produced was cut, machined and ground to produce a contact lens.

The charged amount of each monomer is shown in Table 1. Then, various physical properties of the produced lens were measured in the same way as in Example 1. The results are shown in Table 2.

Examples 3 to 60 and Comparative Examples 1 to 7

The various starting monomers shown in Table 1 were polymerized in the same way as in Example 2 when benzoyl peroxide was used as a radical polymerization initiator shown in Table 1, and in the same way as in Example 1 when otherwise, to produce contact lenses. The charge amount of each monomer is shown in Table 1. Then, various physical properties of the produced contact lenses were measured in the same way as in Example 1. The results are shown in Table 2.

TABLE 1

| Component | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Monomer | Si4-MA | 45 | | | 40 | | | 35 | 33 | | 38 | | | 40 | | | 35 | 45 |
| | Si3-MA | | 45 | | | 42 | | | 15 | 43 | | 40 | | | 45 | | | |
| | Si7-MA | | | 40 | | | 41 | | | | | | 40 | | | 40 | | |
| | IPF3-Fu | | | | 40 | | 40 | | | 42 | | | | | | | | 30 |
| | IPF6-Fu | 40 | | 45 | | | | 40 | | | | | | | 35 | | | |
| | IPF17-Fu | | 35 | | | | | 40 | | | | | | | | | 35 | |
| | TBF3-Fu | | | | | | | | | | | 40 | | 20 | | 40 | | |
| | TBF9-Fu | | | | | | | | | | | | 40 | | | | | |
| | CHF5-Fu | | | | | | | | | | | | | 20 | | | | |
| | F3F3-Fu | | | | | 38 | | | | | 42 | | | | | | | |
| | VA | | | | 10 | | | | | | | 7 | 5 | | 10 | | | |
| | St | | | | | | 8 | 7 | | | | | 10 | | 10 | | | |
| | EGDMA | | | 15 | | | | | | | | 7 | | | | | 5 | |
| | DEGDMA | 8 | | | | | 5 | | | | | 5 | | 5 | | | | |
| | V-MA | | 10 | | 5 | | | 7 | 8 | | | | | | | | | 7 |
| | A-MA | | | | | 12 | | 8 | | | 7 | | 8 | | 5 | 5 | | |
| | MA | 7 | 10 | 5 | 5 | | | | | 6 | 5 | 5 | | 5 | 5 | 5 | | |
| | HEMA | | | | | 8 | 6 | | | | | | | 5 | | | | |
| | N-VP | | | | | | | 10 | 5 | 7 | | | | 5 | | | | |
| | MMA | | | | | | | | | | | | | | | | 20 | |
| | EMA | | | | | | | | | | | | | | | | | 15 |
| | CHMA | | | | | | | | | | | | | | | | | |
| | AA | | | | | | | | | | | | | | | | | 3 |
| | F3-MA | | | | | | | | | | | | | | | | | |
| | F6-MA | | | | | | | | | | | | | | | | | |
| | F9-MA | | | | | | | | | | | | | | | | | |
| | IPMA | | | | | | | | | | | | | | | | | |
| Polymerization Initiator | ABVN | 1.5 | | 1.5 | | | 1.5 | | | 1.5 | | | 1.5 | 1.5 | | | 1.5 | |
| | IPP | | | | 1.0 | | | 0.8 | 1.0 | | | | | | 1.0 | | | 1.0 |
| | BPO | | 1.0 | | | 0.7 | | | | | 1.0 | 1.0 | | | | 1.0 | | |

| Component | | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|
| Monomer | Si4-MA | | | | 35 | | | 40 | | | 40 | 35 | | 40 | 40 | 36 | | |
| | Si3-MA | | 30 | | | 35 | 35 | | 40 | | | | | | | | 40 | |
| | Si7-MA | 30 | | 35 | | | | | | 40 | | | 35 | | | | | 40 |
| | IPF3-Fu | | | | | | 35 | | | 30 | | | | 30 | | | | 35 |
| | IPF6-Fu | 40 | | | 40 | | | | 35 | | | | | | 40 | | | |
| | IPF17-Fu | | | 20 | | 35 | | | | | | | | | | 35 | | |
| | TBF3-Fu | | | | | | | | | | 20 | | | | | | | |
| | TBF9-Fu | | | | | | | | | | | 25 | | 25 | | | | |
| | CHF5-Fu | | | | | | | | | | | | 30 | | | | | |

TABLE 1-continued

| | | | | | | | | | | | | | | | | | |
|---|---|---|---|---|---|---|---|---|---|---|---|---|---|---|---|---|---|
| | F3F3-Fu | | 30 | | | | 30 | | | | | | | | | | |
| | VA | | | | | | | | | | | | | | | | |
| | St | | | | | | | | | | | | | | | | |
| | EGDMA | | 5 | | 5 | | | 5 | | 5 | | | 5 | 5 | 5 | | |
| | DEGDMA | | | 5 | | | 5 | | | 5 | | | | | | | |
| | V-MA | | | 5 | | 7 | | | | | 5 | | | | | | 5 |
| | A-MA | | | | | 7 | | 5 | | | | 5 | | | | | |
| | MA | 5 | 5 | | 5 | 3 | | 5 | | | 5 | 5 | | 5 | 5 | 5 |
| | HEMA | 5 | | | | | | | 5 | | | | 5 | | | | |
| | N-VP | | | | 5 | | | | | | | | | | | | |
| | MMA | | 30 | | 20 | | 20 | | 20 | | 25 | | 25 | | | | |
| | EMA | | | 35 | | 20 | | 15 | | 30 | | 25 | | | | | |
| | CHMA | 20 | | | 15 | | | | | | | | | | | | |
| | AA | | 5 | | 5 | 3 | | 5 | | | 5 | | | | | | |
| | F3-MA | | | | | | | | | | | | | | 14 | 15 | |
| | F6-MA | | | | | | | | | | | | | 20 | | | 15 |
| | F9-MA | | | | | | | | | | | | | | | | |
| | IPMA | | | | | | | | | | | | | | | | |
| Polymerization | ABVN | | | 1.5 | | | 1.5 | | | 1.5 | 1.5 | | 1.5 | | | | |
| Initiator | IPP | | 1.0 | | 1.0 | | 1.0 | | 1.0 | | | | | | 1.0 | | |
| | BPO | 1.0 | | | 1.0 | | | 1.0 | | | | 1.0 | 1.0 | | | 1.0 | 1.0 |

| | | Example | | | | | | | | | | | | | | | |
|---|---|---|---|---|---|---|---|---|---|---|---|---|---|---|---|---|---|
| Component | | 35 | 36 | 37 | 38 | 39 | 40 | 41 | 42 | 43 | 44 | 45 | 46 | 47 | 48 | 49 | 50 | 51 |
| Monomer | Si4-MA | 45 | | | 40 | | | 40 | 45 | 43 | | | 40 | 36 | 35 | 40 | 43 | |
| | Si3-MA | | 45 | | | 40 | | | | | 45 | | | | | | | 40 |
| | Si7-MA | | | 45 | | | 40 | | | | | 35 | | | | | | |
| | IPF3-Fu | | | | 30 | | | | | | | | 30 | 30 | | | | |
| | IPF6-Fu | | | | 20 | | | 25 | | | 30 | | | | 28 | | | |
| | IPF17-Fu | | | | | | 25 | | | | | 35 | | | | 27 | | |
| | TBF3-Fu | 25 | | | | | | | | | | | | | | | 25 | |
| | TBF9-Fu | | 25 | | | | | 25 | | | | | | | | | | 25 |
| | CHF5-Fu | | | 28 | | | | | 25 | | 30 | | | | | | | |
| | F3F3-Fu | | | | 30 | | | | | | | | | | | | | |
| | VA | | | | | | | | | | | | | | | | | |
| | St | | | | | | | | | | | | | | | | | |
| | EGDMA | | | | | | | 5 | | 7 | | | 5 | 5 | 5 | | | |
| | DEGDMA | | | | | | | | | | | | | | | | | |
| | V-MA | 5 | | | | 10 | | | 7 | | | | | | | | 5 | 7 |
| | A-MA | | 5 | 5 | 5 | | 10 | | | | 5 | 5 | | | | 5 | | |
| | MA | 5 | | 5 | 5 | 5 | | 5 | 5 | | 5 | 5 | | 5 | 5 | 5 | 5 | |
| | HEMA | | 5 | | | | 5 | | | 5 | | | | | | | | |
| | N-VP | | | | | | | | | | | | | | | | | |
| | MMA | | | | | | | | | | | | | | 15 | 14 | 12 | |
| | EMA | | | | | | | | | | | | | | | | | |
| | CHMA | | | | | | | | | | | | | | | | | |
| | AA | | | | | | | | | | | | 5 | | | | | 5 |
| | F3-MA | | 17 | 5 | | 25 | 25 | | 15 | 15 | | | 10 | | 12 | | | |
| | F6-MA | | 20 | | 15 | 15 | | 18 | | | | | | 10 | | 9 | | 10 |
| | F9-MA | 20 | | | | | | | | | | 20 | | | | | 10 | |
| | IPMA | | | | | | | | | | | | | 14 | | | | 13 |
| Polymerization | ABVN | 1.5 | | 1.5 | | 1.5 | | | | 1.5 | | | 1.5 | 1.5 | | | 1.5 | |
| Initiator | IPP | | | 1.0 | | 1.0 | | | | | 1.0 | | | | 1.0 | | | |
| | BPO | | 1.0 | | | | 1.0 | 1.0 | | | 1.0 | | | | | 1.0 | | 1.0 |

| | | Example | | | | | | | | | Comparative Example | | | | | | |
|---|---|---|---|---|---|---|---|---|---|---|---|---|---|---|---|---|---|
| Component | | 52 | 53 | 54 | 55 | 56 | 57 | 58 | 59 | 60 | 1 | 2 | 3 | 4 | 5 | 6 | 7 |
| Monomer | Si4-MA | 40 | 38 | | | | 38 | 43 | | 40 | 40 | 45 | 40 | 40 | 40 | | |
| | Si3-MA | | | 30 | | | | | | | | | | | | | 45 |
| | Si7-MA | | | | 46 | 42 | | | 35 | | | | | | | 45 | |
| | IPF3-Fu | | | | | 25 | 25 | 30 | | | | | | | | | |
| | IPF6-Fu | | | | 20 | | | | | 25 | | | | | | | |
| | IPF17-Fu | | | 15 | | | | | 30 | | | | | | | | |
| | TBF3-Fu | | | | | | | | | | | | | | | | |
| | TBF9-Fu | | | | | | | | | | | | | | | | |
| | CHF5-Fu | 28 | | | | | | | | | | | | | | | |
| | F3F3-Fu | | 30 | | | | | | | | | | | | | | |
| | VA | | | | | | | | | | | | | | | | |
| | St | | | | | | | | | | | | | | | | |
| | EGDMA | 5 | | | 5 | 5 | | 5 | | | 5 | | 5 | 5 | 5 | | 5 |
| | DEGDMA | | | | | | | | | | | | | | | | |
| | V-MA | | | 5 | | | | | | | | | | | 5 | | |
| | A-MA | | 5 | | | | 5 | | 5 | 5 | | | | | | | |
| | MA | 5 | 5 | | | 5 | 5 | | 5 | 5 | 5 | 5 | 5 | | | 5 | |
| | HEMA | | | | | | | | | | | | | 5 | | | |
| | N-VP | | | | | | | | | | | | | | | | |
| | MMA | 11 | 10 | 27 | | | 7 | 7 | | 10 | 50 | | 20 | | 50 | | 60 |
| | EMA | | | | | | | | | | | | | | | | |
| | CHMA | | | | 16 | | | | | | | | | | | | |
| | AA | | | 8 | 5 | | | 5 | | | | | | | 5 | | |
| | F3-MA | 11 | | | | 10 | | 10 | 15 | | 45 | 30 | 40 | | | 45 | 30 |
| | F6-MA | | 12 | | | 15 | | | 15 | | | 15 | | | | | |

TABLE 1-continued

| | | | | | | | | | | | | | |
|---|---|---|---|---|---|---|---|---|---|---|---|---|---|
| | F9-MA | | | 15 | 8 | | | | | | | | |
| | IPMA | | | | | 13 | | 10 | | | | 10 | |
| Polymerization | ABVN | | | 1.5 | 1.4 | 1.5 | 1.5 | | 1.2 | 1.2 | 1.5 | | 1.5 |
| Initiator | IPP | 1.0 | 1.0 | | | | | 1.1 | 1.0 | | | 1.0 | |
| | BPO | | | | | 10 | | 1.0 | | | 1.0 | | |

The numerical values are based on parts by weight.

Abbreviations for Components used in Table 1
Si4-MA: tris(trimethylsiloxy)silylpropyl methacrylate
Si3-MA: methylbis(trimethylsiloxy)silylpropyl methacrylate
Si7-MA: tris(pentamethyldisiloxanyloxy)silylpropyl methacrylate
IPF3-Fu: isopropyl-2,2,2-trifluoroethyl fumarate
IPF6-Fu: isopropyl-2,2,2-trifluoro-1-trifluoromethyl fumarate
IPF-17-Fu: isopropyl-3,3,4,4,5,5,6,6,7,7,8,8,9,9,10,10,10-heptadecafluorodecyl fumarate
TBF3-Fu: tert. butyl-2,2,2-trifluoroethyl fumarate
TBF9-Fu: tert. butyl-3,3,4,4,5,5,6,6,6-nonafluorohexyl fumarate
CHF5-Fu: cyclohexyl-3,3,4,4,4-pentafluorobutyl fumarate
F3F3-Fu: bis(2,2,2-trifluoroethyl) fumarate
VA: vinyl acetate
St: styrene
EGDMA: ethyleneglycol dimethacrylate
DEGDMA: diethyleneglycol dimethacrylate
V-MA: vinyl methacrylate
A-MA: allyl methacrylate
MA: methacrylic acid
HEMA: 2-hydroxyethyl methacrylate
N-VP: N-vinyl-2-pyrrolidone
MMA methyl methacrylate
EMA: ethyl methacrylate
CHMA: cyclohexyl methacrylate
AA: acrylic acid
F3-MA: 2,2,2-trifluoroethyl methacrylate
F6-MA: 2,2,2-trifluoro-1-trifluoromethylethyl methacrylate
F9-MA: 3,3,4,4,5,5,6,6,6-nonafluorobutyl methacrylate
IPMA: isopropyl methacrylate
ABVN: azobis(2, 4-dimethylvaleronitrile)
IPP: diisopropylperoxy dicarbonate
BPO: benzoyl peroxide

TABLE 2

| | | DK Value[*1] | Resistance against Contamination | HV | Contact Angle | Bending Stress[*2] | Modulas of Elasticity[*3] | Stability in Shape |
|---|---|---|---|---|---|---|---|---|
| Ex. | 1 | 11.8 | Good | 7.8 | 42 | 7.9 | 1250 | Acceptable |
| | 2 | 10.6 | " | 8.9 | 38 | 7.7 | 1200 | " |
| | 3 | 11.3 | " | 8.6 | 43 | 8.1 | 1090 | " |
| | 4 | 10.2 | " | 9.2 | 43 | 9.1 | 1190 | " |
| | 5 | 9.8 | " | 6.9 | 39 | 7.2 | 910 | " |
| | 6 | 10.0 | " | 9.4 | 41 | 8.0 | 1080 | " |
| | 7 | 11.7 | " | 9.3 | 38 | 8.1 | 1190 | " |
| | 8 | 12.2 | " | 9.0 | 43 | 8.0 | 1240 | " |
| | 9 | 9.4 | " | 9.9 | 40 | 8.4 | 1290 | " |
| | 10 | 9.6 | " | 7.1 | 42 | 7.3 | 990 | " |
| | 11 | 8.9 | " | 10.0 | 45 | 9.0 | 1280 | " |
| | 12 | 9.9 | " | 8.7 | 43 | 7.7 | 1040 | " |
| | 13 | 10.0 | " | 9.3 | 37 | 8.5 | 1150 | " |
| | 14 | 9.9 | " | 9.3 | 46 | 8.4 | 1170 | " |
| | 15 | 9.3 | " | 9.6 | 44 | 8.6 | 1210 | " |
| | 16 | 13.5 | " | 8.7 | 43 | 9.3 | 1270 | " |
| | 17 | 9.3 | " | 8.4 | 51 | 7.9 | 1310 | " |
| | 18 | 11.9 | " | 8.4 | 46 | 7.8 | 1180 | " |
| | 19 | 8.8 | " | 9.0 | 39 | 9.7 | 1370 | " |
| | 20 | 8.6 | " | 9.1 | 40 | 8.3 | 1230 | " |
| | 21 | 8.2 | " | 8.8 | 46 | 7.8 | 980 | " |
| | 22 | 9.3 | " | 9.5 | 44 | 9.4 | 1000 | " |
| | 23 | 7.6 | " | 9.7 | 44 | 8.7 | 1010 | " |
| | 24 | 10.6 | " | 8.2 | 52 | 7.8 | 970 | " |
| | 25 | 9.9 | " | 8.5 | 43 | 8.6 | 1100 | " |
| | 26 | 9.4 | " | 8.9 | 46 | 9.5 | 1020 | " |
| | 27 | 7.8 | " | 9.2 | 47 | 8.0 | 1180 | " |
| | 28 | 7.2 | " | 9.2 | 41 | 8.9 | 990 | " |
| | 29 | 8.8 | " | 7.3 | 43 | 8.8 | 1240 | " |
| | 30 | 9.3 | " | 8.8 | 45 | 9.0 | 1040 | " |
| | 31 | 13.5 | " | 8.4 | 48 | 8.3 | 1140 | " |
| | 32 | 10.2 | " | 7.9 | 55 | 7.4 | 1130 | " |
| | 33 | 11.9 | " | 8.7 | 49 | 7.2 | 1280 | " |
| | 34 | 9.7 | " | 8.8 | 43 | 8.9 | 1030 | " |
| | 35 | 9.9 | " | 8.6 | 40 | 8.6 | 1160 | " |
| | 36 | 10.2 | " | 8.1 | 49 | 8.1 | 960 | " |
| | 37 | 10.4 | " | 9.1 | 46 | 8.7 | 990 | " |
| | 38 | 8.8 | " | 9.0 | 47 | 8.9 | 1010 | " |
| | 39 | 11.7 | " | 7.9 | 53 | 7.6 | 980 | " |
| | 40 | 10.2 | " | 8.5 | 48 | 8.1 | 990 | " |
| | 41 | 10.0 | " | 8.9 | 47 | 9.1 | 1020 | " |
| | 42 | 8.8 | " | 9.2 | 49 | 8.2 | 1180 | " |
| | 43 | 8.4 | " | 9.2 | 48 | 8.3 | 980 | " |
| | 44 | 9.3 | " | 7.3 | 42 | 8.5 | 1130 | " |

TABLE 2-continued

|  |  | DK Value[*1] | Resistance against Contamination | HV | Contact Angle | Bending Stress[*2] | Modulas of Elasticity[*3] | Stability in Shape |
|---|---|---|---|---|---|---|---|---|
|  | 45 | 10.1 | " | 8.8 | 51 | 9.1 | 1040 | " |
|  | 46 | 5.8 | " | 8.9 | 39 | 6.5 | 1120 | " |
|  | 47 | 5.5 | " | 8.5 | 42 | 9.1 | 1210 | " |
|  | 48 | 5.2 | " | 8.5 | 42 | 9.2 | 1230 | " |
|  | 49 | 6.1 | " | 7.1 | 41 | 8.7 | 1030 | " |
|  | 50 | 6.7 | " | 8.0 | 38 | 8.5 | 1050 | " |
|  | 51 | 5.9 | " | 8.3 | 39 | 8.2 | 1100 | " |
|  | 52 | 5.3 | " | 8.1 | 43 | 7.9 | 1000 | " |
|  | 53 | 5.8 | " | 5.9 | 32 | 8.0 | 940 | " |
|  | 54 | 5.3 | " | 8.9 | 31 | 10.1 | 1220 | " |
|  | 55 | 8.6 | " | 6.2 | 37 | 8.2 | 990 | " |
|  | 56 | 7.1 | " | 7.9 | 38 | 8.3 | 1010 | " |
|  | 57 | 5.9 | " | 8.1 | 47 | 7.8 | 1100 | " |
|  | 58 | 6.8 | " | 6.8 | 45 | 7.6 | 1060 | " |
|  | 59 | 5.5 | " | 7.2 | 34 | 7.9 | 1090 | " |
|  | 60 | 5.6 | " | 7.1 | 34 | 9.8 | 1110 | " |
| Comp. Ex. | 1 | 2.4 | " | 8.6 | 29 | 9.8 | 1280 | " |
|  | 2 | 5.4 | 1.2[*4] | 7.4 | 58 | 5.7 | 740 | Not Acceptable |
|  | 3 | 3.8 | Good | 7.9 | 42 | 7.2 | 900 | " |
|  | 4 | 5.0 | 0.6[*4] | 7.7 | 45 | 6.8 | 820 | " |
|  | 5 | 2.4 | Good | 8.6 | 30 | 7.8 | 1280 | Acceptable |
|  | 6 | 5.4 | 1.2[*4] | 7.4 | 41 | 5.7 | 740 | Not Acceptable |
|  | 7 | 1.2 | Good | 9.8 | 51 | 8.3 | 1310 | Acceptable |

[*1] $\times 10^{-10}$ ml·cm/cm$^2$·sec·mmHg
[*2] kgf/mm$^2$
[*3] N/mm$^2$
[*4] μg/cm$^2$ Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A contact lens article comprising a resin obtained by copolymerizing starting monomer components containing a silicon-containing compound (A) represented by the formula (I)

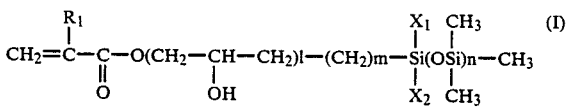

wherein $R_1$ represents a hydrogen atom or a methyl group, $X_1$ and $X_2$ each represent a methyl group or

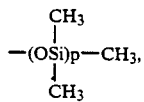

represents 0 or 1, m represents an integer of 1 to 3 and n and p each represent an integer of 0 to 3;

a fluorine-containing compound (B) represented by the formula (II)

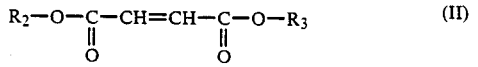

wherein at least one of $R_2$ and $R_3$ represents a straight chain or branched chain fluoroalkyl group represented by $-C_hH_kF_{2h+1-k}$ in which h represents an integer of 2 to 18, k represents an integer of 1 to 2 multiplied by h and when one of $R_2$ and $R_3$ is $-C_hH_kF_{2h+1-k}$, the other of $R_2$ and $R_3$ represents an alkyl group having 1 to 12 carbon atoms, an alkenyl group having 2 to 12 carbon atoms or a cycloalkyl group having 3 to 12 carbon atoms; and a radical polymerizable vinyl monomer.

2. A contact lens article according to claim 1 wherein said silicon-containing compound (A) is selected from the group consisting of trimethylsilyl (meth)acrylate, pentamethyl disiloxanyl methyl (meth)acrylate, methylbis(trimethylsiloxy)silylmethyl (meth)acrylate, tris(trimethylsiloxy)silylmethyl (meth)acrylate, bis(trimethylsiloxy)(pentamethyldisiloxanyloxy)silylmethyl (meth)acrylate, trimethylsiloxy bis(pentamethyl(meth)disiloxanyloxy)silylmethyl (meth)acrylate, tris(pentamethyldisiloxanyloxy)silylmethyl (meth)acrylate, trimethylsilylethyl (meth)acrylate, pentamethyldisiloxanylethyl (meth)acrylate, methylbis(trimethylsiloxy)silylethyl (meth)acrylate, tris(trimethylsiloxy)silylethyl (meth)acrylate, bis(trimethylsiloxy)(pentamethyldisiloxanyloxy)silylethyl (meth)acrylate, trimethylsiloxybis(pentamethyldisiloxanyloxy)silylethyl (meth)acrylate, tris(pentamethyldisiloxanyloxy)silylethyl (meth)acrylate, trimethylsilylpropyl (meth)acrylate, pentamethyldisiloxanylpropyl (meth)acrylate, methylbis(trimethylsiloxy)silylpropyl (meth)acrylate, tris(trimethylsiloxy)silylpropyl (meth)acrylate, bis(trimethylsiloxy)(pentamethyldisiloxanyloxy)silylpropyl (meth)acrylate, trimethylsiloxybis(pentamethyldisiloxanyloxy)silylpropyl (meth)acrylate, tris(pentamethyldisiloxanyloxy)silylpropyl (meth)acrylate, 2-hydroxy-3-trimethylsilylethoxypropyl (meth)acrylate, 2-hydroxy-3-pentamethyldisiloxanylethoxypropyl (meth)acrylate, 2-hydroxy-3-methylbis(trimethylsiloxy)silylethoxypropyl (meth)acrylate, 2-hydroxy-3-bis(trimethylsiloxy)(pentamethylsiloxanyloxy) silylethoxypropyl (meth)acrylate, 2-hydroxy-3-tris(trimethylsiloxy)silylethoxypropyl (meth)acrylate, 2-hydroxy-3-trimethylsiloxybis(pentamethyldisiloxanyloxy)silylethoxypropyl (meth)acrylate, 2-hydroxy-3-tris(pentamethyldisiloxanyloxy)silylethoxypropyl (meth)acrylate, 2-hydroxy-3-trimethylsilylpropyloxypropyl (meth)acrylate, 2-hydroxy-3-pentamethyldisiloxanylpropyloxypropyl (meth)acrylate, 2-hydroxy-3-methylbis(trimethylsiloxy)silylpropyloxypropyl (meth)acrylate, 2-hydroxy-3-(bis)(trimethylsiloxy)(pentamethyldisiloxanyloxy)silylpropyloxypropyl (meth)acrylate, 2-hydroxy-3-tris(trimethylsiloxy)silylpropyloxypropyl (meth)acrylate, 2-hydroxy-3-trimethylsiloxybis(pentamethyldisiloxanyloxy)silylpropyloxypropyl (meth)acrylate, 2-hydroxy-3-tris(pentamethyldisiloxanyloxy)silylpropyloxypropyl (meth)acrylate, dimethyl(triphenylsiloxy)silylpropyl (meth)acrylate, and mixtures thereof.

3. A contact lens article according to claim 1 wherein said fluorine-containing compound (B) is selected from the group consisting of methyl-2,2,2-trifluoroethyl fumarate and maleate, methyl-2,2,2-trifluoro-1-trifluoromethylethyl fumarate and maleate, methyl-3,3,4,4,5,5,6,6,6-nonafluorohexyl fumarate and maleate, allyl (2,2,2-trifluoroethyl) fumarate and maleate, allyl(2,2,2-trifluoro-1-trifluoromethyl)ethyl fumarate and maleate, allyl-3,3,4,4,5,5,6,6,6-nonafluorohexyl fumarate and maleate, isopropyl-2,2,2-trifluoroethyl fumarate and maleate, isopropyl(2,2,2-trifluoro-1-trifluoromethyl) ethyl fumarate and maleate, isopropyl-3,3,4,4,4-pentafluorobutyl fumarate and maleate, isopropyl-3,3,4,4,5,5,6,6,6-nonafluorohexyl fumarate and maleate, isopropyl-3,3,4,4,5,5,6,6,7,7,8,8,8-tridecafluorooctyl fumarate and maleate, isopropyl-3,3,4,4,5,5,6,6,7,7,8,8, 9,9,10,10,10-heptadecafluorodecyl fumarate and maleate, isopropyl-2,2,3,3-tetrafluoropropyl fumarate and maleate, isopropyl-2,2,3,3,4,4,5,5-octafluoropentyl fumarate and maleate, tert-butyl-2,2,2-trifluoroethyl fumarate and maleate, tert-butyl-2,2,2-trifluoro-1-trifluoromethylethyl fumarate and maleate, tert-butyl-3,3,4,4,4-pentafluorobutyl fumarate and maleate, tert-butyl-3,3,4,4,5,5,6,6,6-nonafluorohexyl fumarate and maleate, tert-butyl-3,3,4,4,5,5,6,6,7,7,8,8,8-tridecafluorooctyl fumarate and maleate, tert-butyl-3,3,4,4,5,5,6,6,7,7, 8,8,9,9,10,10,10-heptadecafluorodecyl fumarate and maleate, tert-butyl-2,2,3,3-tetrafluoropropyl fumarate and maleate, tert-butyl-2,2,3,3,4,4,5,5-octafluoropentyl fumarate and maleate, 2-ethylhexyl-2',2',2'-trifluoroethyl fumarate and maleate, 2-ethylhexyl-2',2',2'-trifluoro-1'-trifluoromethylethyl fumarate and maleate, 2-ethylhexyl-3',3', 4',4',4'-pentafluorobutyl fumarate and maleate, 2-ethylhexyl-3',3',4',4',5',5',6',6'-nonafluorohexyl fumarate and maleate, 2-ethylhexyl-3',3',4',4',5',5',6',6', 7',7',8',8',8'-tridecafluorooctyl fumarate and maleate, 2-ethylhexyl-3',3',4',4',5',5',6',6',7',7', 8',8',9',9', 10',10',10'-heptadecafluorodecyl fumarate and maleate, 2-ethylhexyl-2',2',3',3'-tetrafluoropropyl fumarate and maleate, 2-ethylhexyl-2',2',3',3',4',4',5',5'-octafluoropentyl fumarate and maleate, cyclohexyl-2,2,2-trifluoroethyl fumarate and maleate, cyclohexyl-2,2,2-tri-fluoro-1-trifluoromethylethyl fumarate and maleate, cyclohexyl-3,3,4,4,4-pentafluorobutyl fumarate and maleate, cyclohexyl-3,3,4,4,5,5,6,6,6-nonafluorohexyl fumarate and maleate, cyclohexyl-3,3,4,4,5,5,6,6,7,7,8,8,8-tridecafluorooctyl fumarate and maleate, cyclohexyl-3,3,4,4,5,5, 6,6,7,7,8,8,9,9,10,10,10-heptadecafluorodecyl fumarate and maleate, cyclohexyl-2,2,3,3-tetrafluoropropyl fumarate and maleate, cyclohexyl-2,2,3,3,4,4,5,5-octafluoropentyl fumarate and maleate, bis(2,2,2-trifluoroethyl) fumarate and maleate, bis(2,2,2-trifluoro-1-trifluoroethyl) fumarate and maleate, bis(3,3,4,4,4-pentafluorobutyl) fumarate and maleate, bis(3,3,4,4,5,5,6,6,6-nonafluorohexyl) fumarate and maleate, bis(3,3,4,4,5,5,6,6,7,7,8,8,8-tridecafluoroctyl) fumarate and maleate, bis(3,3,4,4,5,5,6,6,7,7,8,8,9,9, 10,10,10-heptadecafluorodecyl) fumarate and maleate, bis(2,2,3,3-tetrafluoropropyl) fumarate and maleate, bis(2,2,3,3,4,4,5,5-octafluoropentyl) fumarate and maleate, and mixtures thereof.

4. A contact lens article according to claim 1 wherein said radical polymerizable vinyl monomer is selected from the group consisting of ethyleneglycol di(meth)acrylate, diethyleneglycol di(meth)acrylate, triethyleneglycol di(meth)acrylate, tetraethyleneglycol di(meth)acrylate, dipropyleneglycol di(meth)acrylate, trimethylolpropane tri(meth)acrylate, diallyl phthalate, diallyl isophthalate, diallyl terephthalate, vinyl (meth)acrylate, allyl (meth)acrylate, diethylene glycolbisallyl carbonate, 2-allyloxyethyl (meth)acrylate, triallyl trimellitate, triallyl cyanurate, triallyl isocyanurate, divinylbenzene, divinyl adipate, and mixtures thereof.

5. A contact lens article according to claim 1 wherein said radical polymerizable vinyl monomer is selected from the group consisting of (meth)acrylic acid, 2-hydroxyethyl (meth)acrylate, (meth)acrylic amide, N, N-dimethylacrylamide, N-vinyl-2-pyrrolidone, acryloyl morpholine, and mixtures thereof.

6. A contact lens article according to claim 1 wherein said radical polymerizable vinyl monomer is selected from the group consisting of styrene, p-methylstyrene, o-chlorostyrene, p-chlorostyrene, vinyl acetate, vinyl propionate, vinyl pivalate, ethyl vinyl ether, n-butyl vinyl ether, vinyl pyridine, and mixtures thereof.

7. A contact lens article according to claim 1 wherein said starting monomer components comprise 10 to 90 wt.% of said silicon-containing compound (A) and 90 to 10 wt.% of said fluorine-containing compound (B), and further comprise 0.1 to 50 parts by weight of said radical polymerizable vinyl monomer based on 100 parts by weight of said compounds (A) and (B) summed together.

8. A contact lens article according to claim 1 wherein said starting monomer components further comprise at least one of vinyl compounds (C) represented by the formula (III)

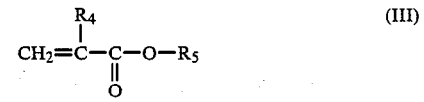

wherein $R_4$ represents a hydrogen atom or a methyl group and $R_5$ represents an alkyl group having 1 to 12 carbon atoms, an alkenyl group having 2 to 12 carbon atoms, a cycloalkyl group having 3 to 12 carbon atoms, an aromatic ring-containing group, or a straight chain or branched chain fluoroalkyl group shown by $-C_hH_kF_{2h+1-k}$ 'h being an integer of 2 to 18 and k being an integer of 1 to 2 X h.

9. A contact lens article according to claim 8 wherein said vinyl compound (C) is selected from the group consisting of methyl (meth)acrylate, ethyl (meth)acrylate, isopropyl (meth)acrylate, tert-butyl (meth)acrylate, cyclohexyl (meth)acrylate, benzyl (meth)acrylate, and mixtures thereof.

10. A contact lens article according to claim 8 wherein said vinyl compound (C) is selected from the group consisting of 2,2,2-trifluoroethyl (meth)acrylate, 2,2,2-trifluoro-1-trifluoromethylethyl (meth)acrylate, 3,3,4,4,5,5,5-heptafluoropentyl (meth)acrylate, 3,3,4,4,5,5,6,6,6-nonafluorohexyl (meth)acrylate, 3,3,4,4,5,5,6,6,7,7,8,8,8-tridecafluorooctyl (meth)acrylate, 3,3,4,4,5,5,6,6,7,7,8,8,9,9,10,10,10-heptadecafluorodecyl (meth)acrylate, 1,1,2,2-tetrahydroperfluorooctadecyl (meth)acrylate, 2,2,3,3-tetrafluoropropyl (meth)acrylate, 2,2,3,3,4,4,5,5,6,6,7,7,8,8,9,9-hexadecafluorononyl (meth)acrylate, 2,2,3,3,4,4,5,5,6,6,7,7,8,8,9,9,10,10,11,11-eicosafluoroundecyl (meth)acrylate, and mixtures thereof.

11. A contact lens article according to claim 8 wherein said starting monomer components comprise 10 to 70 wt.% of said silicon-containing compound (A), 5 to 60 wt.% of said fluorine-containing compound (B) and 5 to 70 wt.% of said vinyl compound (C).

12. A contact lens article according to claim 11 comprising 0.1 to 50 parts by weight of said radical polymerizable vinyl monomer based on 100 parts by weight of said starting monomer components.

* * * * *

UNITED STATES PATENT AND TRADEMARK OFFICE
CERTIFICATE OF CORRECTION

PATENT NO. : 4,933,406

DATED : June 12, 1990

INVENTOR(S) : Keizo ANAN et al.

It is certified that error appears in the above-identified patent and that said Letters Patent is hereby corrected as shown below:

Column 16, lines 43 and 44:

Claim 2, line 8:

"bis(pentamethyl(meth)disiloxanyloxy)" should read
--bis(pentamethyldisiloxanyloxy)--

Signed and Sealed this

Seventeenth Day of September, 1991

Attest:

HARRY F. MANBECK, JR.

Attesting Officer

Commissioner of Patents and Trademarks